(12) United States Patent
Cohen

(10) Patent No.: US 8,347,352 B2
(45) Date of Patent: Jan. 1, 2013

(54) METHOD AND SYSTEM FOR SECURING A THIRD PARTY COMMUNICATION WITH A HOSTING WEB PAGE

(75) Inventor: Efraeim Cohen, Herzliya (IL)

(73) Assignee: Mediamind Technologies Ltd., Herzliya (IL)

( * ) Notice: Subject to any disclaimer, the term of this patent is extended or adjusted under 35 U.S.C. 154(b) by 344 days.

(21) Appl. No.: 12/610,826

(22) Filed: Nov. 2, 2009

(65) Prior Publication Data

US 2010/0115585 A1  May 6, 2010

Related U.S. Application Data

(60) Provisional application No. 61/193,169, filed on Nov. 3, 2008.

(51) Int. Cl.
*G06F 17/30* (2006.01)
*G06F 11/00* (2006.01)
*G06Q 30/00* (2012.01)

(52) U.S. Cl. .................................. 726/2; 726/22; 705/14

(58) Field of Classification Search .................. 726/2–3, 726/11–15, 22–33; 709/203, 246–349, 217–219; 713/150–154
See application file for complete search history.

(56) References Cited

U.S. PATENT DOCUMENTS

| 2008/0282338 | A1* | 11/2008 | Beer | 726/12 |
|---|---|---|---|---|
| 2008/0313648 | A1 | 12/2008 | Wang et al. | |
| 2009/0070869 | A1* | 3/2009 | Fan et al. | 726/22 |
| 2009/0132713 | A1* | 5/2009 | Dutta et al. | 709/227 |
| 2009/0177527 | A1* | 7/2009 | Flake et al. | 705/10 |

\* cited by examiner

*Primary Examiner* — Jeffrey D Popham
*Assistant Examiner* — Evans Desrosiers
(74) *Attorney, Agent, or Firm* — Myers Wolin, LLC

(57) ABSTRACT

A method and system for securing hosting web pages from malicious third party modules. The method includes uploading a third party module to a hosting web page; validating a proxy API call received from the third party module, wherein the proxy API call includes at least a payload parameter provided by the third party module; generating an engine API call including at least the payload parameter; validating the engine API call; and executing the payload parameter if the engine API call is validated.

9 Claims, 3 Drawing Sheets

METHOD AND SYSTEM FOR SECURING A THIRD PARTY COMMUNICATION WITH A HOSTING WEB PAGE

CROSS-REFERENCE TO RELATED APPLICATIONS

This application claims the benefit of U.S. provisional application No. 61/193,169 filed on Nov. 3, 2008, the contents of which are herein incorporated by reference.

FIELD OF THE INVENTION

The present invention relates generally to securing mashup web pages.

BACKGROUND OF THE INVENTION

Web browsers are increasingly becoming a single stop resource for computing needs including information access, personal communications, e-commerce and much more. Consequently, web pages are designed to combine data and functionality from two or more external sources to create a new service. In the related art, such web pages are known as "mashup pages."

The mashup technology allows integrating data and functionality into a web page using one or more open application programming interfaces (APIs). A prime example of a mashup web page is an online advertisement hosted within a page, typically in a form of a banner. The banner generally promotes a specific vendible product and when is clicked upon, the user is linked, for example, to the advertiser's site, where more detailed information is provided about the products or services. An online advertisement is typically displayed as a combination of text, audio, still images, animation, video, and interactivity content forms. Different content types may be different objects of a rich-media advertisement. Rich media content can be downloadable or may be embedded in a webpage and can be viewed using a media player. The media player may be a plug-in or an offline application. An example for a rich media format and player is Flash provided by Adobe®.

The mashup web page is typically referred to a "hosting web page" and the external objects to "third party modules." The drawback of the mashup architecture is that the hosting web page is vulnerable to attacks from third party modules, as these modules have a full access to APIs of the hosting web page. In the related art, solutions to secure hosting web page includes, for example, browser abstractions. The web browser abstractions facilitate resource management and an access control. The browser abstractions are implemented using dedicated HTML tags, e.g., <sandbox> and a script proxy provided as an extended of a web browser.

The disadvantage of this approach is that APIs of hosting pages are still exposed to malicious third party modules. In addition, in order to secure hosting web pages, a web browser installed in each client should be updated to include the script proxy. In today's environment, where different vendors provide their web version, the security approach of web browser abstractions is not feasible.

Therefore, it would be advantageous to provide an efficient solution for securing web pages hosting third party modules.

SUMMARY OF THE INVENTION

Certain embodiments of the invention include a method for securing hosting web pages from malicious third party modules, wherein a hosting web page includes at least a sand-box proxy and a sandbox engine. The method includes uploading a third party module to the hosting web page; validating a proxy API call received from the third party module, wherein the proxy API call includes at least a payload parameter provided by the third party module; generating an engine API call including at least the payload parameter; validating the engine API call; and executing the payload parameter if the engine API call is validated.

Certain embodiments of the invention also include a secure agent for securing hosting web pages from malicious third party modules. The secure agent comprises a sand-box proxy for proxying between a third party module and a hosting web page; and a sand-box engine for executing a validated script of the third party module over the hosting web page.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
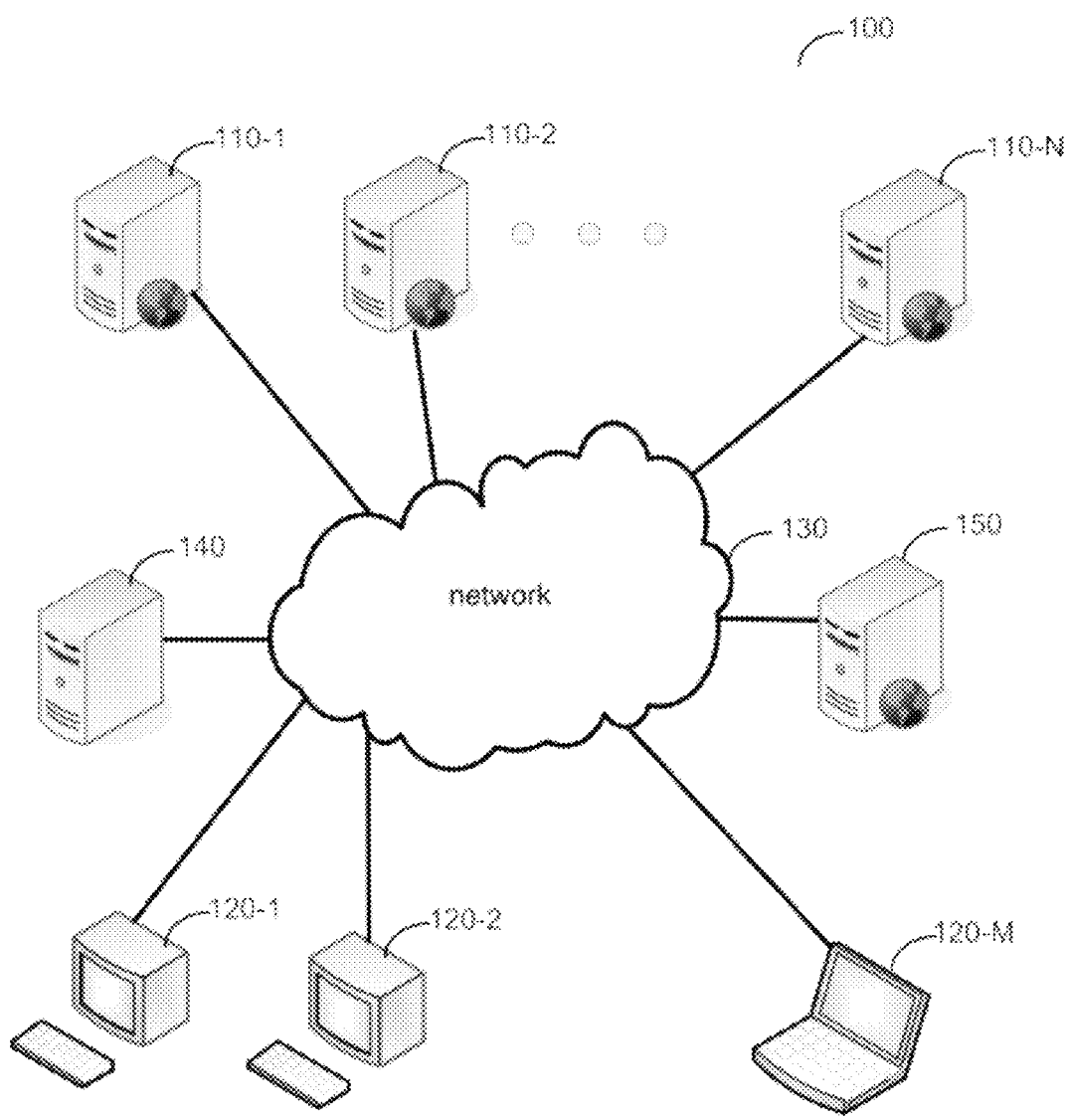
FIG. 1 is a diagram illustrating a network system utilized to describe the principles of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary illustration of a network system 100 utilized to describe the principles of the invention. The network system 100 includes a plurality of servers 110-1 through 110-N (collectively referred to as "server 110") and clients 120-1 through 120-M (collectively referred to as "client 120") that communicate through a network 130, for example, a wide area network (WAN), that enables a connectivity such as Internet connectivity, and further including at least one publisher server 140. A client 120 comprises a web browser, such as Microsoft® Internet Explorer® allowing the user to view and navigate through web pages downloaded from one or more servers 110 and/or publisher server 140.

The publisher server 140 is connected to the network 130 and is capable of embedding third party modules in hosting web pages downloaded from servers 110 and further uploading the web pages with the third party modules to clients' 120 web browsers. The third party modules are downloaded from one or more servers 150 belonging to one or more third party vendors. In accordance with an embodiment of the invention, third party modules are online advertisements and the vendors are advertisement agencies. In accordance with the principles of the invention all third party modules embedded in a hosting web page, by the publisher server 140, cannot directly access APIs of the hosting web page.

Figure 2:
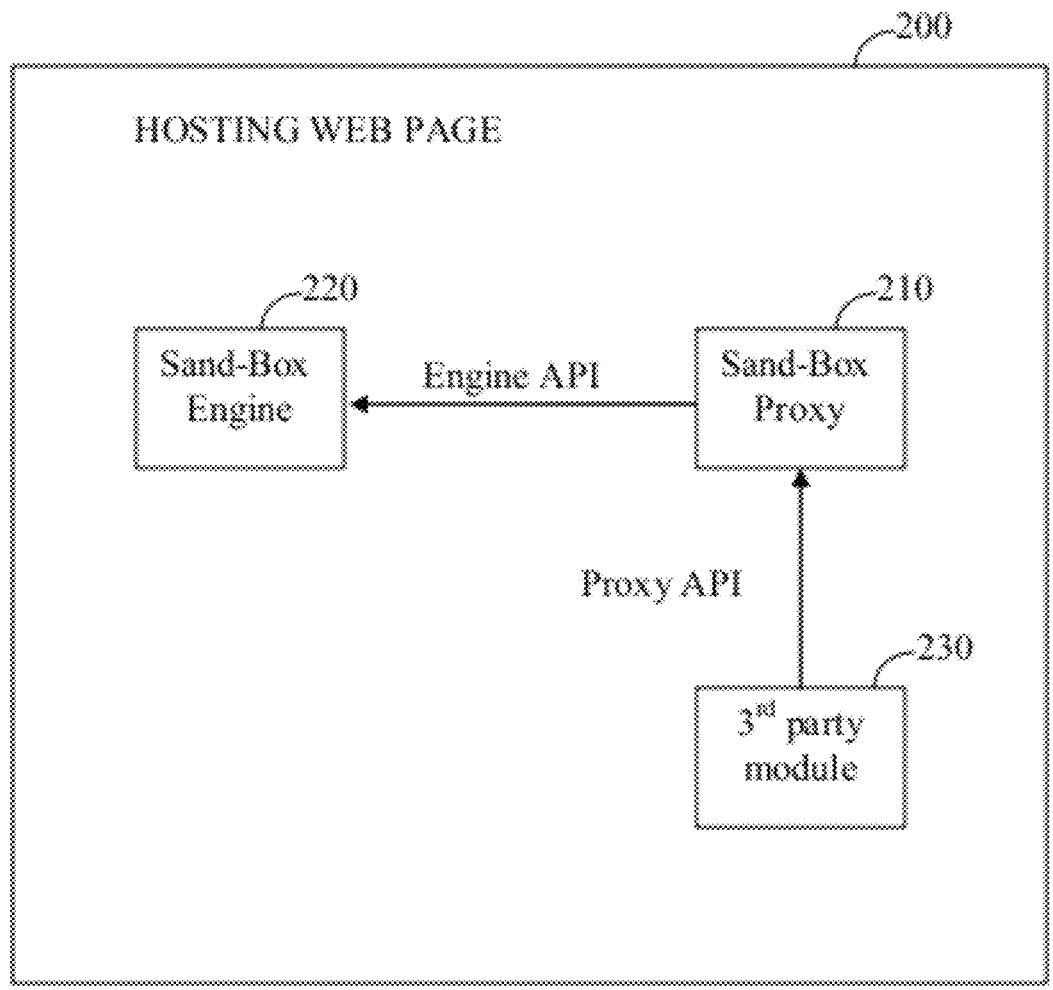
FIG. 2 is a diagram of a hosting web page architecture provided in accordance with an embodiment of the invention.

A non-limiting and exemplary diagram of a hosting web page 200 constructed in accordance with an embodiment of the invention is shown in FIG. 2. The hosting web page 200 includes a sand-box proxy 210 and a sand-box engine 220 that together provide a security protection layer for the page 200. The sand-box proxy 210 and sand-box engine 220 block a third party module 230 from directly executing any actions on the hosting web page 200. With this aim, the sand-box proxy 210 dynamically loads the third party module 230 to the hosting web page 200, and once uploaded the module 230 cannot directly call or access the hosting web page using an API exposed by the page 200. Rather, the third-party module 230 can communicate only with sand-box proxy 210 through a predefined API (hereinafter the "proxy API") exposed by the proxy 210. The proxy API includes at least a payload parameter encapsulating an executable script. This script is typically a process being executed by the sand-box engine 220 to run over the hosting web page 200. It should be noted that a typical architecture of a hosting web page (mashup page) does not include the sand-box proxy 210 and engine 220. Thus, according to the principles of certain embodiments of the invention, the third-party module 230 can be blocked from running a harmful script over the hosting web page 200.

The sand-box proxy 210 receives the proxy API call and determines if the call is potentially harmful using a set of validation rules. For example, if the third party module 230 tries to access a restricted network resource. In accordance with an embodiment of the invention only validated proxy API calls are sent to the sand-box engine 220. The sand-box proxy 210 generates a new API call (hereinafter the "engine API") which it can communicate with the sand-box engine 220. The engine API has a predefined format having an API (method) name and parameters. The payload portion includes the proxy API, i.e., the script to be executed.

The sand-box engine 220 performs a set of checks to determine if the script included in the payload of the engine API is potentially harmful. Validated scripts are safe for execution. It should be appreciated that the sand-box proxy 210 and engine 220 control all communication from the third-party module 230 to the hosting web page 200, thereby providing a sealed and safe environment for the page 200.

In certain implementations if the hosting web page 200 includes more than one third party module 230, a single sand-box proxy 210 handles API calls from a single third-party module 230. The sand-box engine 220 validates and executes all API calls received from all sand-box proxies 210.

The sand-box proxy 210, sand-box engine 220, and third party module 230 may be implemented as executable code (e.g., a Flash "swf" file) temporary stored in a readable medium in the client 120 and are executed thereon. The client 120 maybe any computing device including at least a processor and a computer readable medium. In certain embodiments the sand-box engine 220 and one or more sand-box proxies 210 can be implemented as part of a secure agent.

Figure 3:
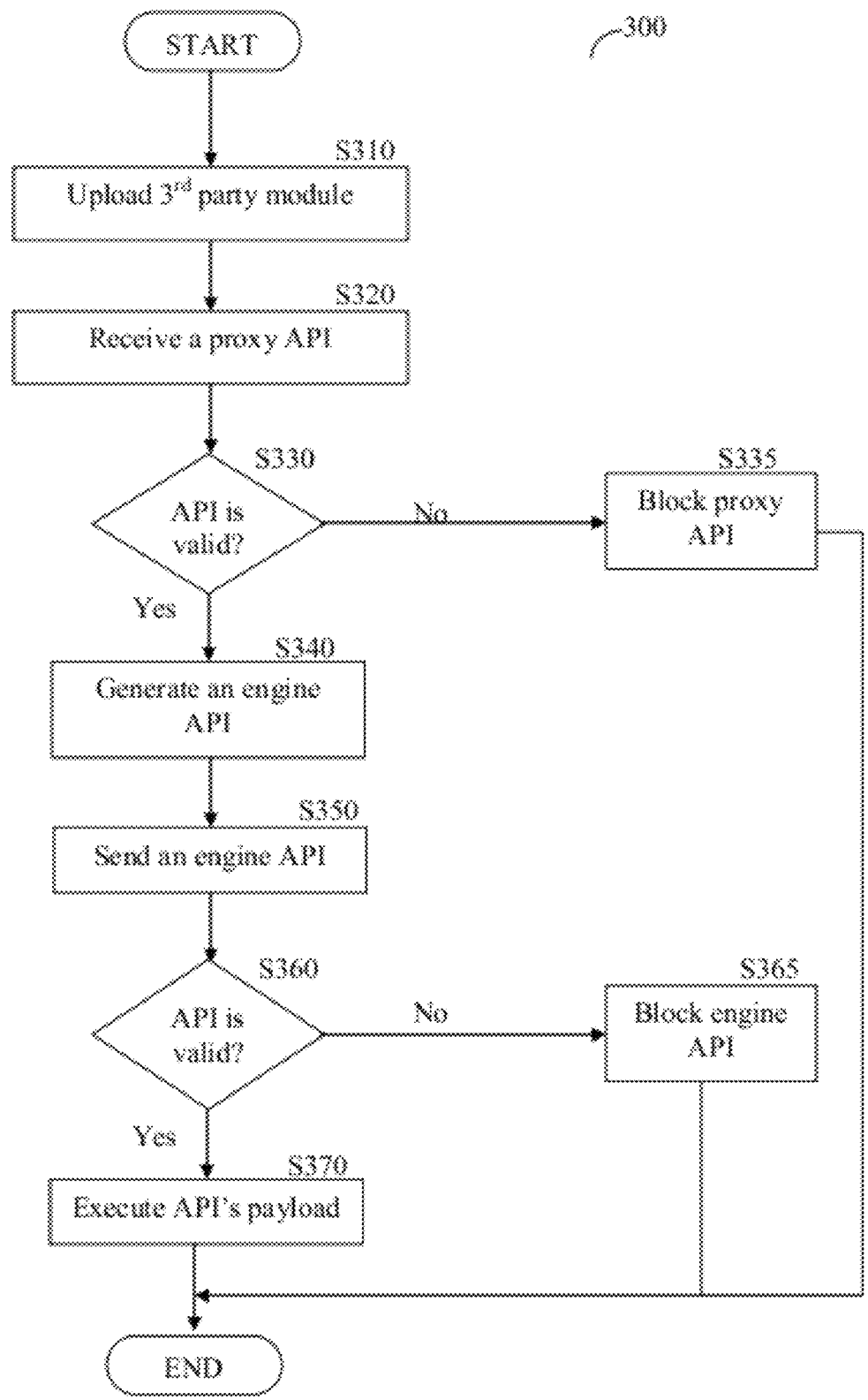
FIG. 3 is a flowchart illustrating a method for securing a hosting web page.

FIG. 3 shows a non-limiting and exemplary flowchart 300 describing the method for securing hosting web pages (mashup pages) implemented in accordance with an embodiment of the invention. In one embodiment of the invention the method is performed by the sand-box proxy 210 and engine 220 shown in FIG. 2.

At S310, a third party module is uploaded to a hosting web page by the sand-box proxy. Thereafter, the sand-box proxy 210 and the third-party module can communicate with each other using a proxy API exposed by the sand-box proxy 210. The format of the proxy API may be predefined and includes at least an API name and API's parameters. As a non-limiting example, the proxy API may be:

ExecuteScript(String Payload, Boolean isRunSync)

ExecuteScript is an API's name of a public method that the proxy 210 exposes to the third party module. The third party module calls this method when there is a need to communicate with the hosting web page. Other examples for public methods may be resizeBrowserWindow, ShakeBrowserWindow, and the like. The Payload and isRunSync are the API's parameters. The Payload is a string that includes a script that the proxy should delegate to the engine 220. The script could be a single function call or a block of inline script that the engine 220 is required to execute once validated. The isRunSync is a Boolean parameter (true/false) that indicates whether the script should be executed, by the engine 220, in a sequential or parallel mode. The engine 220 can handle engine API calls received from one or proxies 210 either in a parallel or in a sequential manner. The calls are processed in the order determined by the isRunSync parameter.

At S320 a proxy API call sent by the third party module is received at the sand-box proxy 210. At S330, the content of the received API proxy's payload is validated by the sand-box proxy 210 in order to detect malicious operations. This step is performed using one or more validation rules selected from a predefined set of rules. A non-limiting example for a validation rule is a check performed to determine if a third-party module tries to read private information (e.g., a credit card number) from the hosting web page. Another example is a rule that scans for invalid third party network addresses, through which the module can transfer information to malicious third party servers. Another example is a rule that checks for malicious code (e.g., a virus or a Trojan horse) in the script included in the payload parameter. This rule blocks attackers from breaching the sand-box environment and bypassing the proxy 210. A person with ordinary skill in the art can easily define a new set of validation rules based on the above teachings.

If the proxy API is valid, execution continues with S340, otherwise, at S335 the proxy API is blocked (i.e., the API call is not relayed to the engine 220). In accordance with another embodiment, the script in proxy API's payload can be modified to correct security breaches. For example, a DOM of the hosting page can be restricted to a write only option in order to prevent reading of private information. As another example any access to unknown servers' addresses can be blocked.

At S340, an engine API is generated by the sand-box proxy 210 by including at least the proxy API's payload in the engine API's parameters. The engine API may be formatted as described above. Once ready, the engine API is sent, at S350, to the sand-box engine 220 where the validity of the API call is being checked (S360). Specifically, the engine 220 checks the received API using one or more rules selected from a predefined set of rules. One rule includes verification of the source of the engine API, i.e., if this API call originated from a known sand-box proxy 210. The rules described in detail above can also be utilized by the sand-box engine 220. If the engine API is determined to be valid, execution continues with S370 where the payload's content (or script) is executed by the sand-box engine 220; otherwise, at S365, the engine API is discarded.

The principles of the invention can be implemented as hardware, firmware, software or any combination thereof. Moreover, the software is preferably implemented as an application program tangibly embodied on a program storage unit, computer readable medium, or machine readable medium. One of ordinary skilled in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for securing hosting web pages from malicious third party modules, comprising:
    uploading a hosting web page to a client device, wherein the hosting web page includes at least a sand-box proxy and a sandbox engine, the hosting web page is a mashup web page;
    uploading a third party module to the hosting web page;
    validating a proxy application programming interface (API) call received from the third party module, wherein the proxy API call includes at least a payload parameter provided by the third party module;
    generating an engine API call including at least the payload parameter;
    validating the engine API call; and
    executing by the sand-box engine over the hosting web page the payload parameter if the engine API call is validated.

2. The method of claim 1, wherein the validation of the proxy API call is performed by the sand-box proxy.

3. The method of claim 2, wherein validating the proxy API call further comprising:
    checking the contents of the payload parameter against at least one validation rule being selected from a set of predefined rules.

4. The method of claim 3, wherein the payload parameter includes at least an executable script.

5. The method of claim 4, wherein an engine API call is generated by the sand-box proxy to include at least the payload parameter of a validated proxy API call.

6. The method of claim 2, wherein the validation of the engine API call is performed by the sand-box engine.

7. The method of claim 6, wherein validating the engine API call further comprising:
    checking the contents of the payload parameter against at least one validation rule being selected from a set of predefined rules; and
    checking if the engine API call received from a known sand-box proxy.

8. The method of claim 1, wherein the third party module is at least an online advertisement downloaded from a third party server.

9. A non-transitory computer readable medium having stored thereon computer executable code when executed by a client causing the client to perform the process of securing hosting web pages from malicious third party modules, the client comprises at least a processor and the readable medium, the process comprising:
    uploading a hosting web page to a client device, wherein the hosting web page includes at least a sand-box proxy and a sandbox engine, the hosting web page is a mashup web page;
    uploading a third party module to the hosting web page;
    validating a proxy application programming interface (API) call received from the third party module, wherein the proxy API call includes at least a payload parameter provided by the third party module;
    generating an engine API call including at least the payload parameter;
    validating the engine API call; and
    executing by the sand-box engine over the hosting web page the payload parameter if the engine API call is validated.

* * * * *